United States Patent
Sundaresan et al.

(10) Patent No.: US 8,452,581 B2
(45) Date of Patent: May 28, 2013

(54) TECHNIQUE USING POWER MACROMODELING FOR REGISTER TRANSFER LEVEL POWER ESTIMATION

(75) Inventors: Krishnan Sundaresan, Sunnyvale, CA (US); Pravin Chander Chandran, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 845 days.

(21) Appl. No.: 12/436,019

(22) Filed: May 5, 2009

(65) Prior Publication Data
US 2010/0286974 A1 Nov. 11, 2010

(51) Int. Cl.
*G06F 17/50* (2006.01)

(52) U.S. Cl.
CPC .................................. *G06F 17/5022* (2013.01)
USPC ............................... 703/14; 703/13; 716/109

(58) Field of Classification Search
USPC ........................ 703/13–14; 716/109
See application file for complete search history.

(56) References Cited

U.S. PATENT DOCUMENTS

| | | | |
|---|---|---|---|
| 7,346,479 B2 * | 3/2008 | Baez | 703/14 |
| 7,711,968 B2 * | 5/2010 | Dang et al. | 713/300 |
| 7,913,201 B2 * | 3/2011 | Chaudhry et al. | 716/103 |

OTHER PUBLICATIONS

Liu et al. "Power Consumption Estimation in CMOSs VLSI Chips"., IEEE Jun. 1994., p. 663-670.*
Givargis et al. "Evaluating Power Consumption of Parameterized Cache and Bus Architectures in System-on-a-Chip Designs"., IEEE Aug. 2001., p. 500-508.*

* cited by examiner

*Primary Examiner* — Eunhee Kim
(74) *Attorney, Agent, or Firm* — Osha Liang LLP

(57) ABSTRACT

A method for estimating power consumption of a design block of an integrated circuit includes obtaining power consumption data from designs of older-generation microprocessors, selecting a set of power consumption parameters, applying a curve-fitting technique on the obtained power consumption data for the selected set of power consumption parameters, creating a new power consumption model based on the curve-fitting technique and one or more of the power consumption parameters, using the model at a register transfer level of a newer-generation microprocessor to represent estimates of register transfer level power consumption of the newer-generation microprocessor, and outputting the register transfer level power consumption estimates based on the model.

18 Claims, 5 Drawing Sheets

| Design | Gates | Flops | Nets | Headers | Layout_Area | Pin_Activities | Net_Activities | Clock Power (mW) | Interconnect Power (mW) |
|---|---|---|---|---|---|---|---|---|---|
| Block_1 | 188 | 54 | 199 | 4 | 5678.40 | 0 | 0.0251 | 1.02 | 0.00 |
| Block_2 | 1720 | 372 | 2079 | 32 | 33096.96 | 0.15 | 0.0682 | 6.94 | 2.84 |
| Block_3 | 3008 | 803 | 3867 | 77 | 75955.36 | 0.15 | 0.1067 | 22.30 | 18.58 |
| Block_4 | 12295 | 1982 | 14270 | 210 | 111256.08 | 0.25 | 0.0547 | 54.88 | 26.99 |
| Block_5 | 11150 | 2066 | 13292 | 237 | 241791.68 | 0.25 | 0.0753 | 61.13 | 34.21 |

FIG. 2

TECHNIQUE USING POWER MACROMODELING FOR REGISTER TRANSFER LEVEL POWER ESTIMATION

BACKGROUND OF INVENTION

1. Field of the Invention

The present disclosure relates generally to microprocessor power consumption estimation and, more specifically, to power macromodeling techniques for register transfer level (RT-level) power estimation.

2. Background Art

In the modern computer and electronics age, power consumption has become a leading design constraint for microprocessors. Power consumption of a microprocessor may include, among other things, standard cell power consumption (e.g., power consumed by logic components and elements of a standard cell library), net or interconnect power consumption (e.g., power consumed by charging/discharging of capacitances of wires), and custom cell power consumption (e.g., power consumed by custom-designed blocks such as memories). To develop techniques for reducing microprocessor power consumption and optimizing microprocessor performance, it has become increasingly important to predict and measure microprocessor power consumption with high accuracy. "Power macromodeling" is known in the art to predict microprocessor power consumption early in the design cycle, e.g., at the RT-level.

As is well-known in the art of integrated circuit (IC) design, RT-level describes a level of operation of a digital circuit above the gate level. At the RT-level, a circuit is defined in terms of hardware registers and combinational logic blocks that join them such that the circuit's behavior can be described by the flow of signals among the registers and the combinational logic blocks that perform logical operations on those signals. RT-level can be expressed in hardware description languages (HDL), such as VHDL and Verilog, which can be compiled and reduced to actual gates and wirings. For example, the registers and combination logic defined in HDL can be synthesized and mapped by a logic synthesis or electronic design automation (EDA) tools directly to an equivalent hardware implementation file for field-programmable gate arrays (FPGA). As a result, modern designs for digital systems can begin at a very high level of abstraction, and later be reduced to lower-level design implementations.

Because power consumption is a critical concern for designers, it is beneficial to measure power consumption at various phases of the design cycle, including at the RT-level. Conventional RT-level power estimation techniques rely solely on switching activity and architectural simulation techniques to predict power dissipation in the design. Conventional techniques of high-level power modeling and estimation cannot account for certain factors, e.g., circuit parasitics (i.e., resistances and capacitances that dissipate power), because gate level structural representations are not available at the RT-level.

SUMMARY OF INVENTION

In one aspect, embodiments of the present invention relate generally to a method for estimating power consumption of an integrated circuit. The method includes obtaining power consumption data from designs of older-generation microprocessors, selecting a set of power consumption parameters, applying a curve-fitting technique on the obtained power consumption data for the selected set of power consumption parameters, creating a new power consumption model based on the curve-fitting technique and one or more of the power consumption parameters, using the model at a register transfer level of a newer-generation microprocessor to represent estimates of register transfer level power consumption of the newer-generation microprocessor, and outputting the register transfer level power consumption estimates based on the model.

In another aspect, embodiments of the present invention relate generally to a microprocessor power estimation system, which includes a memory and a set of computer-readable instructions stored in the memory. The instructions cause the system to obtain power consumption data from designs of older-generation microprocessors, select a set of power consumption parameters, apply a curve-fitting technique on the obtained power consumption data for the selected set of power consumption parameters, create a new power consumption model based on the curve-fitting technique and one or more of the power consumption parameters, use the model at a register transfer level of a newer-generation microprocessor to represent estimates of register transfer level power consumption of the newer-generation microprocessor, and output the register transfer level power consumption estimates based on the model.

Other aspects and advantages of the invention will be apparent from the following description and the appended claims.

BRIEF DESCRIPTION OF DRAWINGS

FIG. 2 shows a table of a sample training set data, built from past microprocessor designs, of a power macromodel in accordance with one embodiment of the present invention.

DETAILED DESCRIPTION

Specific embodiments of the disclosure will be described with reference to the accompanying figures. Like items in the figures are shown with the same reference numbers.

In the following detailed description of embodiments, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

One or more embodiments of the present invention provide a power macromodeling technique that predicts power consumption of a new design block of an integrated circuit, e.g., a microprocessor, at the RT-level. A power macromodel may be an equation representing power consumption of a particular microprocessor block based on numerous power consumption parameters. Using power consumption data from designs of older-generation microprocessors of the same or similar family, and mathematical curve-fitting techniques such as a response surface model (RSM), an equation-based model can be derived for predicting the power consumed by various parts of design blocks of newer-generation microprocessors. Appropriate scaling factors may also be taken into account for technical differences (e.g., differences in voltage, frequency, etc.).

Figure 1:
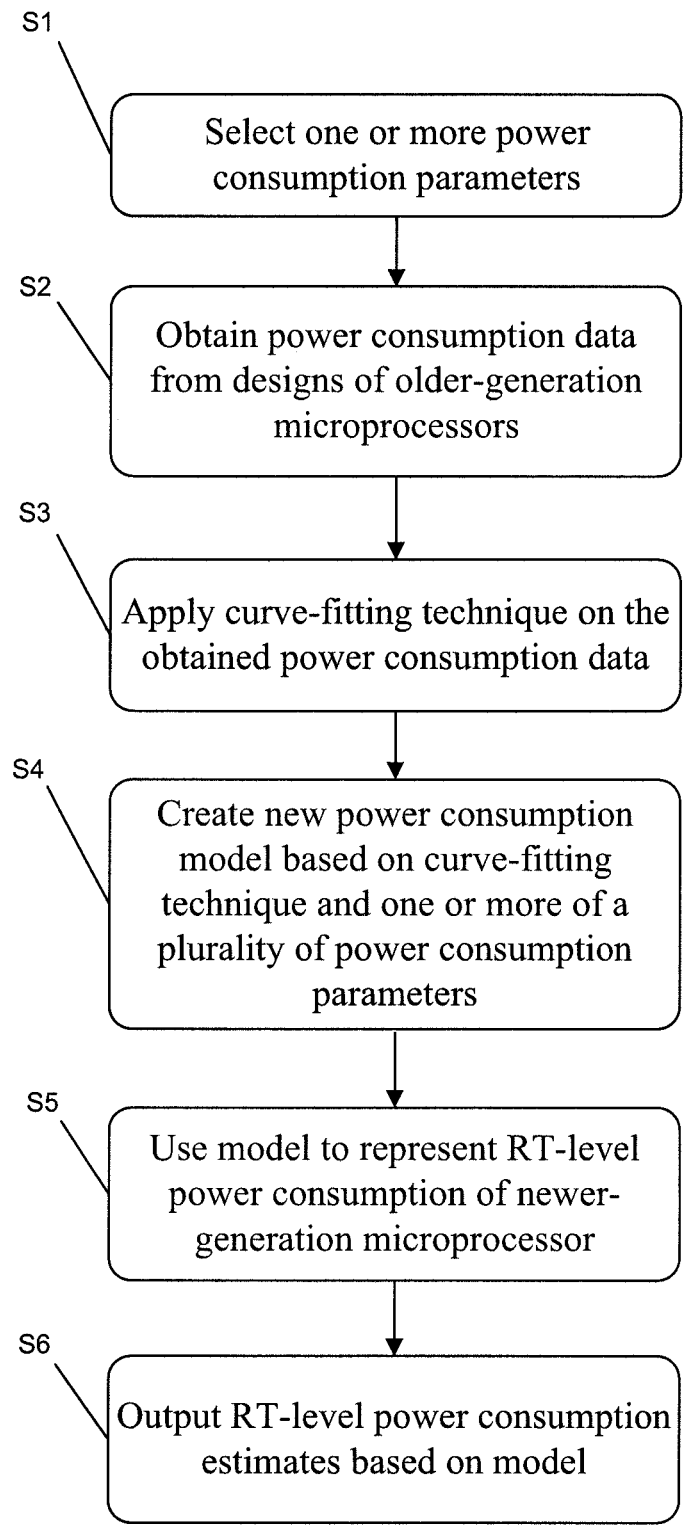
FIG. 1 shows a flowchart of a process for building a power macromodel in accordance with an embodiment of the present invention.

For example, FIG. 1 shows a flowchart of a process for building a power macromodel in accordance with an embodiment of the present invention. Using this process, a model can be built for estimating power consumption of a microprocessor design block. In this embodiment, appropriate power consumption parameters are selected (S1). The power consumption parameters may include one or more of the following: number of gates in the block; number of interconnects in the block; number of sequential elements in the block; and layout area of the block. Those skilled in the art will appreciate many other parameters that can be used in place of or in conjunction with the above. Power consumption data from past designs of microprocessors are also obtained (S2). Then, a curve-fitting technique or algorithm is used on the obtained power consumption data (S3). Any known curve-fitting technique may be used. A new power consumption model is created based on the curve-fitting technique and one or more of a plurality of power consumption parameters (S4). Then, the model is used at an RT-level of the newer-generation microprocessor to represent RT-level power consumption of the newer-generation microprocessor (S5). Based on this model, power consumption estimates of the microprocessor may be outputted (S6).

According to one or more embodiments, the resulting power macromodel can estimate the power consumption of all control and data path structures of a microprocessor at the RT-level. More specifically, for example, the power macromodeling techniques in accordance with one or more embodiments may utilize equations based on signal statistics and switching activity through architectural simulation, and other relevant power consumption parameters that can be mapped to a particular microprocessor block's realization on silicon. The power macromodels may be built to estimate various types of power consumption, such as clock network power consumption, signal interconnect power consumption, custom cell power consumption, etc. Further, as will be explained in detail below, the power macromodel according to one or more embodiments may be tuned for accuracy by performing a sensitivity analysis and other testing.

Various parameters sensitive to power consumption may be used, and the scope of the present invention is not limited to any specific parameter or number of parameters. For example, clock power in a given microprocessor control or data path block may depend on structural parameters, such as the block's layout area and the number of gates, interconnects, and sequential elements such as flip-flops and latches. The clock power consumption can be represented as an equation with these parameters as variables and appropriate coefficients obtained through the model-building process. This equation can take various forms, e.g., linear, polynomial with different degrees, RSMs, etc., each type of equation yielding a different level of accuracy for power estimation. For example, a linear model may simply relate a set of parameters to a response, whereas an RSM may fit collections of parameters in a quadratic model, and find optimal values by determining values of parameters that produce a maximum or minimum expected response.

As explained above, power consumption data from past designs may be used to build the power macromodel, which may take the form of a standard linear or polynomial equation or a more complex RSM. In one or more embodiments, the power consumption data from past designs may be obtained using now known (or later developed) power estimation tools at the gate- or transistor-levels, and analyzed using now known (or later developed) statistical analysis techniques.

Those skilled in the art will appreciate many variations to the above processes that are within the spirit of the present invention. In one embodiment, for example, the power macromodel may be a clock network power model. Various power consumption parameters and data available from past designs may be used to build the model. For example, the parameters may include one or more of the following: number of headers, number of gates, number of flip flops, and other parameters sensitive to power consumption. This model may be represented by the equation:

$$P_{clk} = x^*(\text{number of headers}) + y^*(\text{number of gates}) + z^*(\text{number of flip flops}) + \ldots$$

where x, y, and z are coefficients obtained from curve-fitting techniques, e.g., RSM. The dots at the end of the equation indicate that additional terms may be used in the equation. Again, the scope of the present invention is not limited to any specific parameter or number of parameters. Other parameters sensitive to power consumption, in addition to the three given parameters, may be incorporated into the equation. The value of the parameters may be obtained from a structural (gate-level) netlist generated in the design compilation step. The accuracy of the model may be improved by increasing the number of power consumption parameters used as variables in the equation.

In another embodiment, the power macromodel may be an interconnect power macromodel. Various power consumption parameters and data available from past designs may be used to build the model. For example, the parameters may include one or more of the following: number of gates, number of nets, layout area, and other parameters sensitive to power consumption. This model may be represented by the equation:

$$P_{Int} = m^*(\text{number of gates}) + n^*(\text{layout area}) + p^*(\text{number of nets}) + \ldots$$

where m, n, and p are coefficients obtained from curve-fitting techniques, e.g., RSM. The dots at the end of the equation indicate that additional terms may be used in the equation. Again, the scope of the present invention is not limited to any specific parameter or number of parameters. Other parameters sensitive to power consumption, in addition to the three given parameters, may be incorporated into the equation. The value of the parameters may be obtained from a structural (gate-level) netlist generated in the design compilation step. The accuracy of the model may be improved by increasing the number of power consumption parameters used as variables in the equation.

In a manner similar to the above examples, power estimate macromodels for various other structures of a design may also be obtained.

In one or more embodiments, appropriate scaling factors to the resulting models may be applied to further improve accuracy. Power consumption of older to newer microprocessor designs typically scales by known trends. For example, the power estimates obtained from power macromodels can be scaled using clock frequency scaling parameters obtained for a target technology node or technology generation. Additionally, activity factors for various microprocessor components may also be used. For example, power consumption of a new design may be represented as follows:

$$P_{New\_Design} = q^* r^* P_{Int}$$

where q is a scaling factor for supply voltage, frequency, area, etc., and r is an activity factor for microprocessor components.

Further details of the model-building techniques according to one or more embodiments of the present invention are provided below.

As mentioned above, power consumption data from older-generation microprocessors may be used to build the power macromodel. In one or more embodiments, a training set of data from past microprocessor designs may be used, and a power simulation at the gate or transistor-levels on these data may be performed with input vectors representing a wide range of activity factors. The estimated power that will be consumed by various parts of the design, e.g., gates, clock networks, wiring, etc., and the custom blocks, for a given set of input vectors, may thereby be obtained. The power simulation may be performed on power estimation tools or simulation engines, now known or later developed.

A sample training set data according to one or more embodiments may look like the table shown in FIG. 2. The data may then be fed into a curve-fitting tool. The power obtained from the power simulation engine, e.g., vector-based simulation engine, and the power obtained from the macromodel equations may be added to obtain the total power estimation of a target microprocessor block.

According to one or more embodiments, the power macromodel may further be fine-tuned to improve accuracy. For example, the model may be tested on another set of blocks from the same or similar design. In other words, the model may be applied to a test set of blocks that do not overlap with the set of blocks used to build the model to check if the estimated power values are accurate. Sensitivity analysis may additionally be performed to determine if the parameters most sensitive to power consumption were chosen. Power consumption parameters may be added or removed accordingly. This process may be repeated and the model rebuilt to improve accuracy.

Figure 3A:
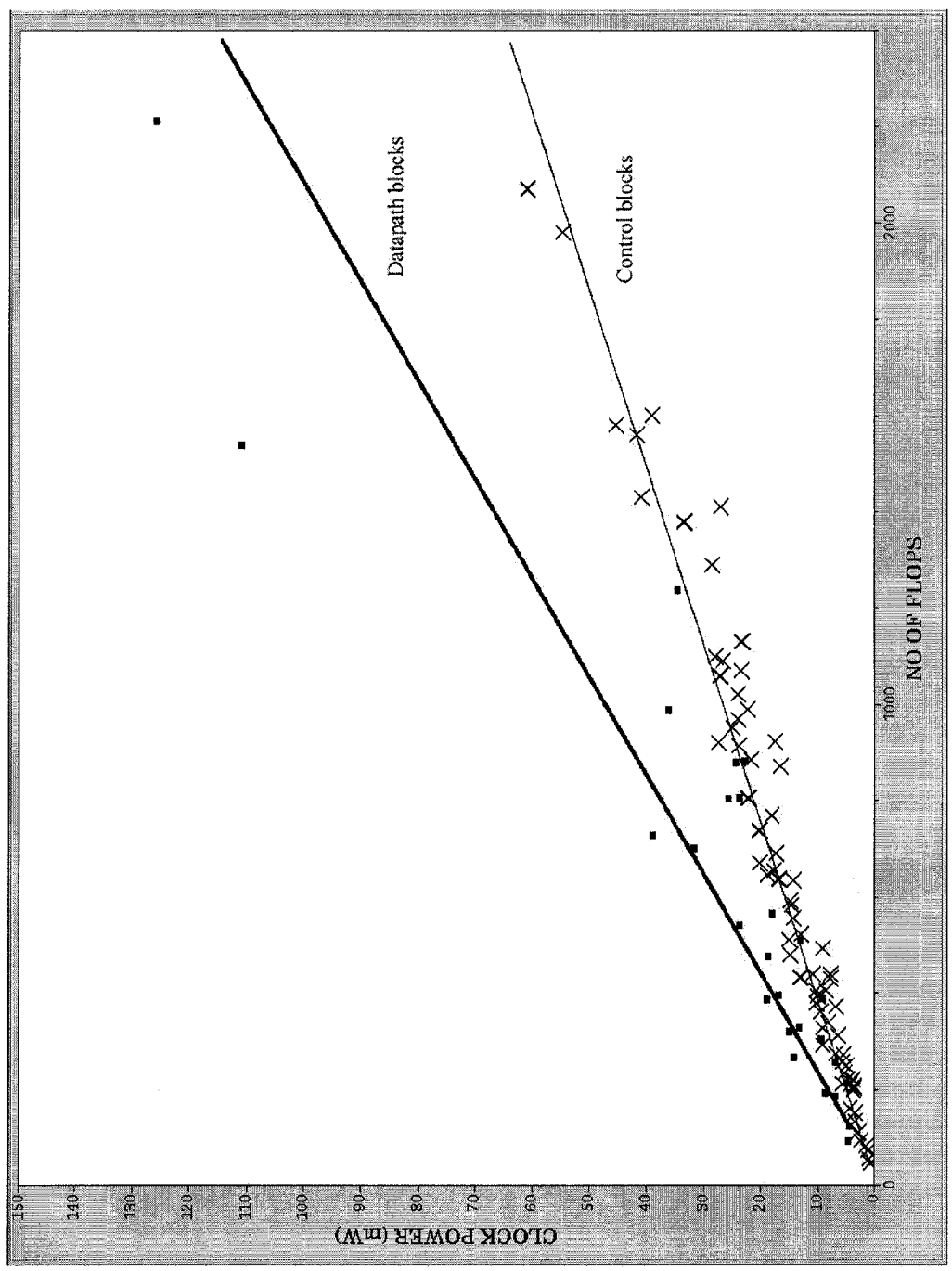
FIG. 3A shows a graphical representation of power estimation in accordance with one embodiment of the present invention.
Figure 3B:
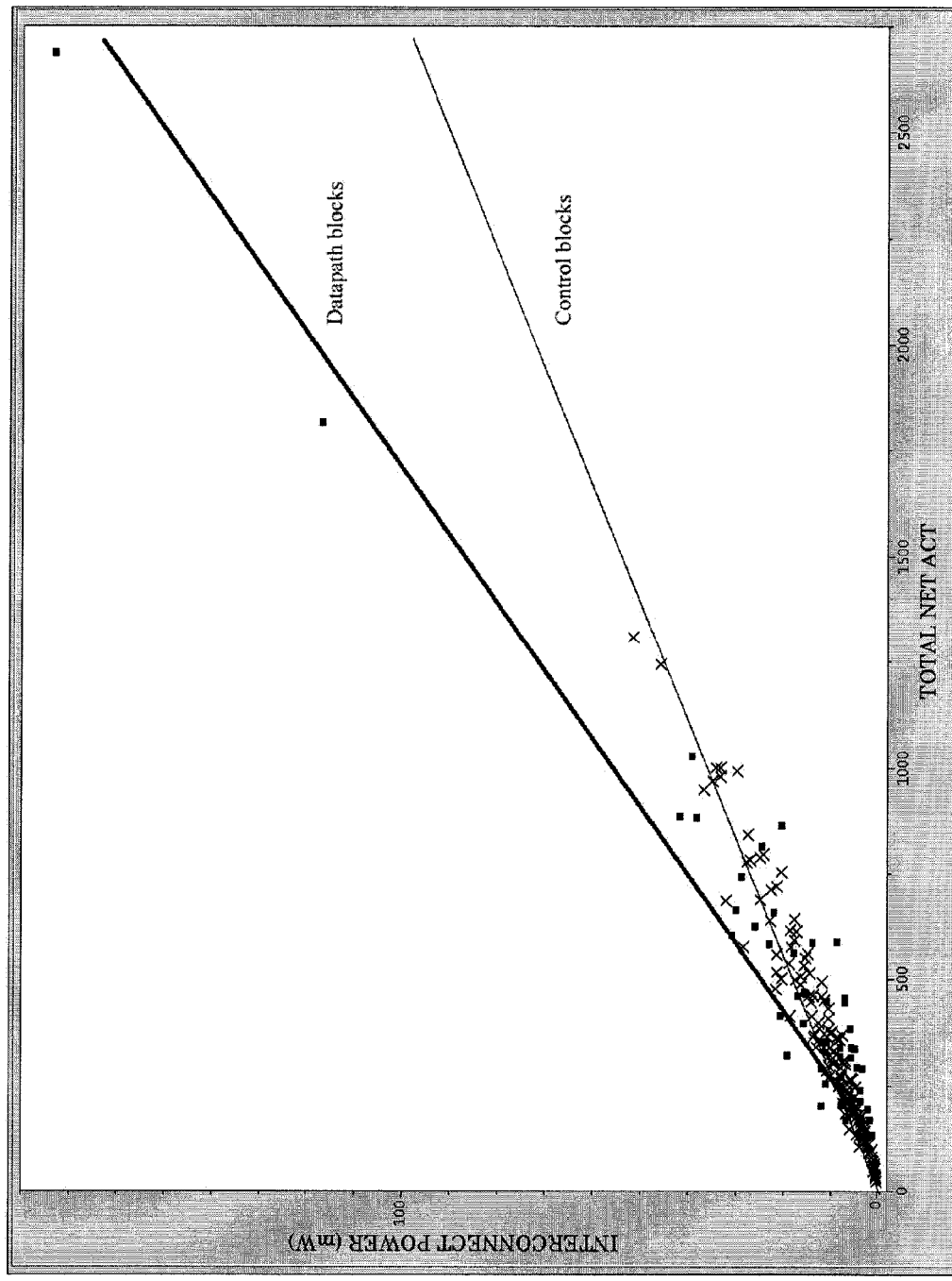
FIG. 3B shows a graphical representation of power estimation in accordance with one embodiment of the present invention.

Further, those skilled in the art will appreciate that separate models may be built for control and data path sections of a block to account for differences in structure or placement of gates, routing, wire activities, etc. These separate models may be used separately or in combination. For example, FIGS. 3A and 3B show graphical representations reflecting both control blocks and data paths and illustrating power consumption plotted against a power consumption parameter. Specifically, in this example, FIG. 3A illustrates clock power consumption plotted against the number of flops, and FIG. 3B illustrates interconnect power consumption plotted against net activities.

Figure 4:
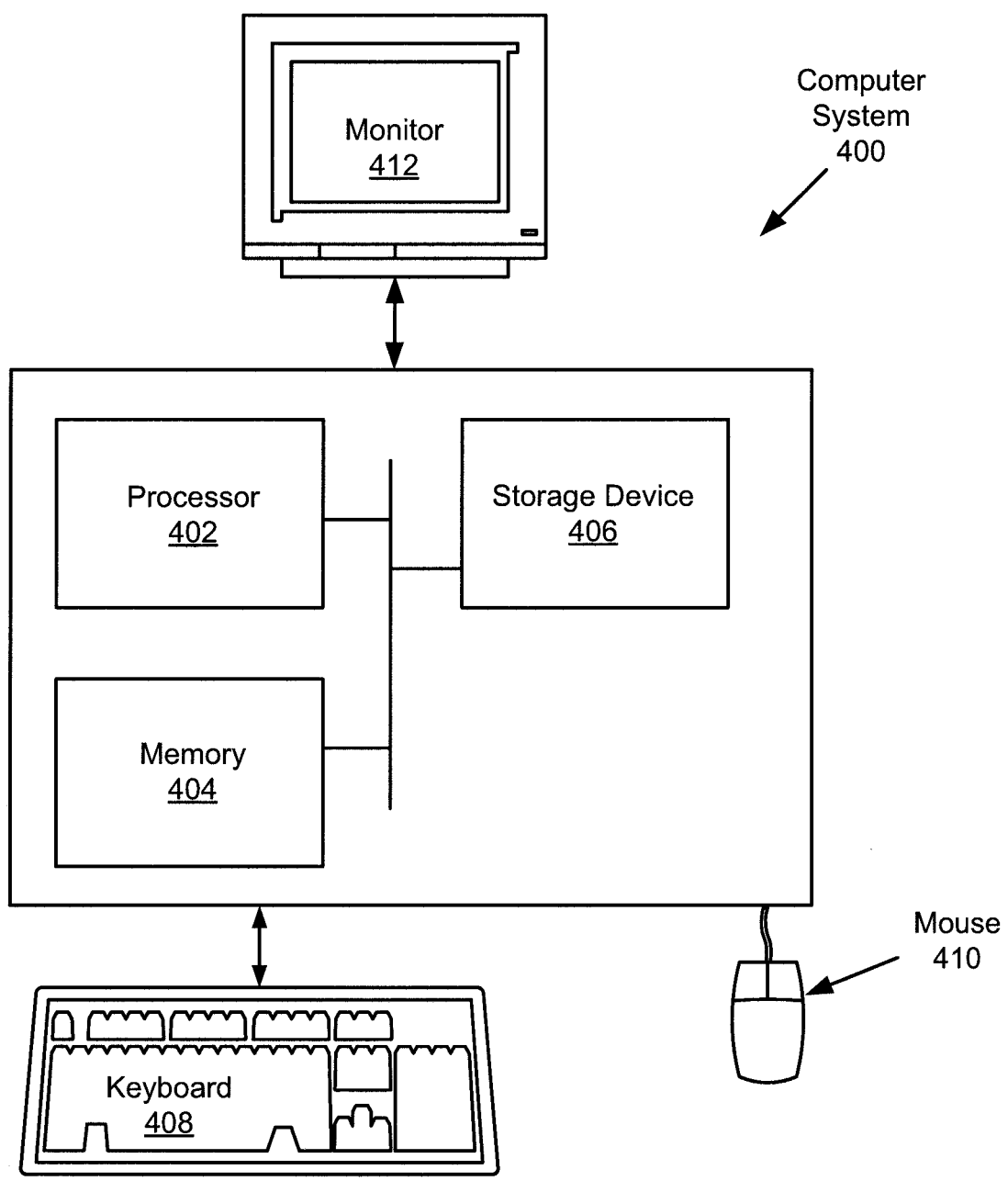
FIG. 4 shows a power estimation system in accordance with an embodiment of the present invention.

The power macromodel process described above may be implemented on any type of computer system. For example, as shown in FIG. 4, a computer system 400 includes a processor 402, associated memory 404, a storage device 406, and numerous other elements and functionalities typical of today's computers (not shown). The memory 404 may include instructions for causing the system 400 to perform a power estimation process in accordance with one or more embodiments of the present invention. For example, the instructions may cause the system 400 to obtain power consumption data from designs of older-generation microprocessors, apply a curve-fitting technique on the obtained power consumption data, and generate a mathematical model representing power consumption of the microprocessor based on the curve-fitting technique and one or more of a plurality of power consumption parameters.

The computer 400 may also include input means, such as a keyboard 408 and a mouse 410, and output means, such as a monitor 412. The computer system 400 is connected to a local area network (LAN) or a wide area network (e.g., the Internet) (not shown) via a network interface connection (not shown). Those skilled in the art will appreciate that these input and output means may take other forms, now known or later developed.

Further, those skilled in the art will appreciate that one or more elements of the aforementioned computer system 400 may be located at a remote location and connected to the other elements over a network. Further, one or more embodiments may be implemented on a distributed system having a plurality of nodes, where each portion of the invention (e.g., intrusion detection system, response rewriter, server, client) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a tangible computer readable medium such as a digital video disc (DVD), compact disc (CD), a diskette, a tape, or any other suitable tangible computer-readable storage device.

Advantages of embodiments of the present invention may include one or more of the following. By using various parameters (e.g., the block's layout area and the number of gates, interconnects, and sequential elements), power consumption of the microprocessor block can be predicted with high accuracy at the RT-level. One or more embodiments of the present invention captures power consumption measurement parameters that are closely related to a design's realization on silicon, such as layout area, number of gates, interconnects, wires, and other structural representations that cannot be easily obtained at the RT-level.

A new-generation microprocessor may reuse many components from past designs with minor modifications that do not significantly change the power consumption of individual components, and power consumption typically scales by known trends. Hence, power consumption data from past designs provide an accurate, reliable basis to estimate newer design microprocessor power consumption. By mapping these power consumption data to a newer-generation microprocessor block's realization on silicon, power estimation techniques according to one or more embodiments of the present invention can provide accurate power consumption estimates of all control and data path structures of a microprocessor at the RT-level, in which structural representations like clock and wire networks and custom cells are not available.

Using the macromodels in accordance with one or more embodiments of the present invention in combination with other known or later-developed power estimation techniques may further improve accuracy at the RT-level. For example, power estimates for standard cell library gates may be obtained using standard cell characterization tools and incorporated into the power estimation process. Other table- or equation-based power macromodels may be built for custom structures like static random access memories, translation lookaside buffers, etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for estimating power consumption of a design block of an integrated circuit, the method comprising:

obtaining power consumption data from designs of older-generation microprocessors;

selecting a set of power consumption parameters;

applying a curve-fitting technique on the obtained power consumption data for the selected set of power consumption parameters;

creating a new power consumption model based on the curve-fitting technique and one or more of the power consumption parameters;

using the model at a register transfer level of a newer-generation microprocessor to represent estimates of register transfer level power consumption of the newer-generation microprocessor;

outputting the register transfer level power consumption estimates based on the model; and, generating at least one additional model representing power consumption of the newer-generation microprocessor using one or more of the power consumption parameters, wherein each model represents power consumption of a different component of the newer-generation microprocessor and uses the power consumption parameters most sensitive to the power consumption of the respective component.

2. The method of claim 1, wherein the model is a mathematical model representing power consumption of a particular design block of the newer-generation microprocessor at a register transfer level.

3. The method of claim 2, wherein the set of power consumption parameters comprises at least one of:
number of gates in the block;
number of interconnects in the block;
number of sequential elements in the block; and
layout area of the block.

4. The method of claim 2, further comprising generating at least one additional model representing power consumption of at least one additional design block of the newer-generation microprocessor at the register transfer level.

5. The method of claim 1, wherein the model estimates power consumption of all control path structures and all data path structures of the newer-generation microprocessor.

6. The method of claim 1, further comprising obtaining additional power consumption data based on signal statistics and switching activity through architectural simulation.

7. The method of claim 1, wherein one of the models represents clock network power consumption and another of the models represents wire network power consumption.

8. The method of claim 1, further comprising applying a scaling factor and an activity factor to the model.

9. The method of claim 1, wherein the curve-fitting technique is a response surface model.

10. A microprocessor power estimation system, comprising:
memory; and
a set of computer-readable instructions stored in the memory for causing the system to:
obtain power consumption data from designs of older-generation microprocessors; select a set of power consumption parameters;
apply a curve-fitting technique on the obtained power consumption data for the selected set of power consumption parameters;
create a new power consumption model based on the curve-fitting technique and one or more of the power consumption parameters;
use the model at a register transfer level of a newer-generation microprocessor to represent estimates of register transfer level power consumption of the newer-generation microprocessor;
output the register transfer level power consumption estimates based on the model; and
generate at least one additional model representing power consumption of the newer-generation microprocessor using one or more of the power consumption parameters, wherein each model represents power consumption of a different component of the newer-generation microprocessor and uses the power consumption parameters most sensitive to the power consumption of the respective component.

11. The system of claim 10, wherein the model is a mathematical model representing power consumption of a particular design block of the newer-generation microprocessor at a register transfer level.

12. The system of claim 11, wherein the set of power consumption parameters comprises at least one of:
number of gates in the block;
number of interconnects in the block;
number of sequential elements in the block; and
layout area of the block.

13. The system of claim 11, further comprising generating at least one additional model representing power consumption of at least one additional design block of the newer-generation microprocessor at the register transfer level.

14. The system of claim 10, wherein the model estimates power consumption of all control path structures and all data path structures of the newer-generation microprocessor.

15. The method of claim 10, further comprising obtaining additional power consumption data based on signal statistics and switching activity through architectural simulation.

16. The system of claim 10, wherein one of the models represents clock network power consumption and another of the models represents wire network power consumption.

17. The system of claim 10, further comprising applying a scaling factor and an activity factor to the model.

18. The system of claim 10, wherein the curve-fitting technique is a response surface model.

* * * * *